(12) United States Patent
Caliendo

(10) Patent No.: US 12,113,338 B2
(45) Date of Patent: Oct. 8, 2024

(54) FLEXIBLE WIRE HOLDER

(71) Applicant: Gabriel Caliendo, Lockport, IL (US)

(72) Inventor: Gabriel Caliendo, Lockport, IL (US)

(*) Notice: Subject to any disclaimer, the term of this patent is extended or adjusted under 35 U.S.C. 154(b) by 35 days.

(21) Appl. No.: 17/865,598

(22) Filed: Jul. 15, 2022

(65) Prior Publication Data

US 2023/0013931 A1 Jan. 19, 2023

Related U.S. Application Data

(60) Provisional application No. 63/222,014, filed on Jul. 15, 2021.

(51) Int. Cl.
*H02G 1/08* (2006.01)
*F16G 11/14* (2006.01)

(52) U.S. Cl.
CPC ........... *H02G 1/081* (2013.01); *F16G 11/146* (2013.01); *H02G 1/083* (2013.01)

(58) Field of Classification Search
CPC ...... H02G 1/08; H02G 1/08308; H02G 1/085; H02G 1/088; F16G 11/103; F16G 11/146
See application file for complete search history.

(56) References Cited

U.S. PATENT DOCUMENTS

| | | | | |
|---|---|---|---|---|
| 3,479,013 A * | 11/1969 | Williams | | H02G 1/083 |
| | | | | 254/134.3 R |
| 3,858,848 A * | 1/1975 | MacFetrich | | H02G 1/081 |
| | | | | 403/275 |
| 4,460,159 A * | 7/1984 | Charlebois | | H02G 1/081 |
| | | | | 385/100 |
| 5,209,439 A * | 5/1993 | Coll | | H02G 7/056 |
| | | | | 248/65 |
| D403,932 S * | 1/1999 | Klamm | | D8/14 |
| 6,732,981 B2 * | 5/2004 | Franks | | H02G 7/056 |
| | | | | 248/74.1 |
| 10,688,909 B2 * | 6/2020 | Williams | | B60P 7/0853 |
| 2005/0184280 A1 * | 8/2005 | Rivers | | H02G 1/083 |
| | | | | 254/134.3 FT |
| 2012/0080650 A1 * | 4/2012 | Davidson | | H02G 1/081 |
| | | | | 29/525.08 |
| 2016/0066658 A1 * | 3/2016 | Breen | | F16G 11/143 |
| | | | | 24/130 |
| 2017/0020235 A1 * | 1/2017 | Beitzel | | B63B 21/08 |
| 2021/0273425 A1 * | 9/2021 | Crompton | | H02G 1/081 |

* cited by examiner

*Primary Examiner* — Seahee Hong
(74) *Attorney, Agent, or Firm* — Pauley Erickson & Swanson

(57) ABSTRACT

A flexible wire holder for use with a fish tape includes a lead end for attachment to the fish tape. The lead end includes an oblong loop. The flexible wire holder includes a trail end with a fastener that is engageable with an adjacent wire holder and a separate or integral wire sheath.

19 Claims, 9 Drawing Sheets

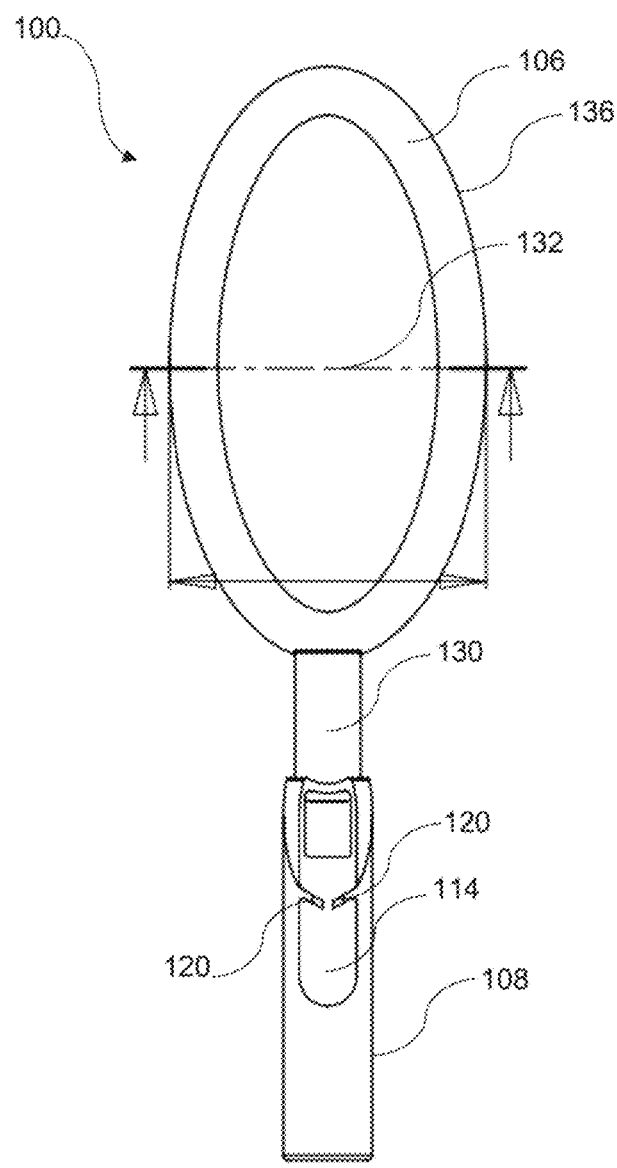
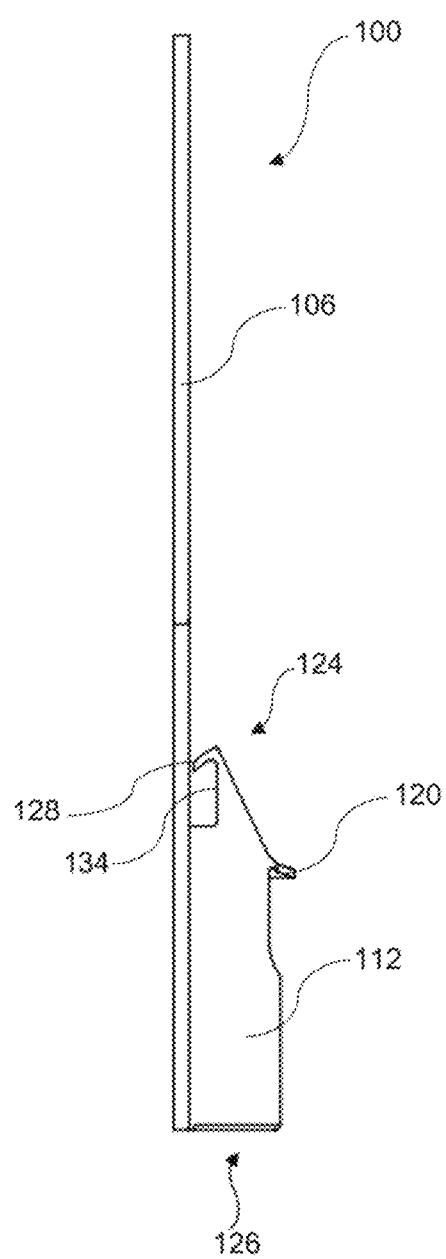
FIG. 3
FIG. 4

FLEXIBLE WIRE HOLDER

CROSS REFERENCE TO RELATED APPLICATION

This application claims the benefit of U.S. Provisional Application Ser. No. 63/222,014, filed on 15 Jul. 2021. The provisional application is hereby incorporated by reference herein in its entirety and is made a part hereof, including but not limited to those portions which specifically appear hereinafter.

BACKGROUND OF THE INVENTION

Field of the Invention

This invention relates generally to wire holders and, more particularly, to devices for pulling electrical wires through a conduit

Discussion of Related Art

Running electrical wires requires pulling wires through a conduit or run. This is often done with a fish tape, a tool used to route new wiring through walls and electrical conduits. Fish tapes, or similar (such as draw wires or draw tapes) often come in a reel of a narrow band of spring steel. The steel can be manipulated and guided through confined spaces. A hook on an end of a fish tape allows an electrician or other user to grasp onto wires or other objects to then pull said objects with the length of the fish tape.

When using a fish tape to pull wires through a conduit, each individual wire must first be stripped, so as to avoid creating too much bulk surface area inside the conduit. Each wire then must be bent (usually to create a hook) which can then be attached to an end of the fish tape. As a multitude of wires usually need to be pulled through a conduit together, a bundle of wires is taped together, usually with electrical tape, to secure the bundle of wires together and to try and avoid the wires snagging on obstacles while traveling through the conduit, pipe, or other cavity. However, given the confined space of the cavities through which the wires are traveling through, the bundle of wires often ends up being too bulky to smoothly travel through a conduit, therefore making it easy for the wires and/or fish tape to snap on obstacles inside pipes such as connectors and the like.

Additionally, once a bundle of wires is pulled through the desired conduit, the electrical tape must be removed from the bundle, each individual wire cut, and the end pieces of the fish tape removed in order to provide a clean fish tape for a subsequent run. This is often a time-consuming and wasteful process which presents multiple points for interference and obstacles each time an electrician needs to pull wires through a cavity. As such, a more efficient device and process is needed.

SUMMARY OF THE INVENTION

The invention generally relates to a wire holder for pulling wires through a conduit. The general object of the invention can be attained, at least in part, through a flexible wire holder for use with a fish tape. The wire holder includes a lead end for attachment to the fish tape. The lead end includes an oblong loop. The wire holder also includes a trail end which includes a wire sheath and/or a fastener. The fastener may be integrated or separate from the wire sheath. The fastener engages with a trailing wire holder by connecting to a trailing oblong loop.

The wire sheath includes a cylindrical tube with an opening on a surface of the wire sheath. The opening on the wire sheath accepts a portion of a wire. The wire sheath may also include a lockable feature on the opening for holding the portion of a wire in the wire sheath. The lockable feature may include two protrusions from the opening on the surface of the wire sheath. The lockable feature may also include a sacrificial break piece across the opening on the surface of the wire sheath. The fastener on the trail end of the wire holder may be located on a lead end of the wire sheath or may be separately positioned from the wire sheath. The fastener can also be located on a trail end of the wire sheath and/or the trail end of the wire holder. The fastener includes a claw hook.

The flexible wire holder also includes a length between the lead end and the trail end of the flexible wire holder. The length between the lead end and the trail end of the flexible wire holder allows for the trailing oblong loop to engage the fastener. Multiple oblong loops are able to connect in a series of flexible wire holders. The series of flexible wire holders passes through a conduit. A diameter of each oblong loop of the multiple oblong loops is larger than an inner diameter of the conduit.

Embodiments of the invention also include a flexible wire holder with a lead end for attachment to a fish tape to be pulled through a conduit. The lead end includes a flexible oblong loop and a trail end with a wire sheath. The wire sheath includes an opening on a surface of the wire sheath. The flexible wire holder also includes a length between the trail end and the lead end.

The wire sheath accepts a portion of a wire. An end of the portion of the wire preferably includes a hook that is inserted into the wire sheath through the opening. The opening of the wire sheath has a backstop protruding laterally across the opening. The backstop engages with the hook portion of the wire. A fastener is preferably located on the wire sheath or separately positioned at a trail end of the wire holder. The fastener is configured to accept an oblong loop of another, adjacent wire holder.

A plurality of flexible wire holders may be connected together. Each wire holder of the plurality of wire holders connects with respect to another wire holder via the flexible oblong loop and the fastener, separated by the length. The fish tape pulls the plurality of flexible wire holders through the conduit. An inner diameter of the conduit is slightly smaller than a diameter of the flexible oblong loop.

The invention also includes a method of using a wire holder to pull at least one wire through a conduit with a fish tape. The method includes hooking the fish tape to an oblong loop on a lead end of a first wire holder inside the conduit, inserting the hook into a wire sheath on a trail end of the first wire holder, creating a hook on an end of the at least one wire, pressing an outer perimeter of the oblong loop against an inner surface of the conduit, and pulling the at least one wire and the first wire holder through the conduit with the fish tape, allowing the fish tape to hook onto the oblong loop without interference from the inner surface of the conduit. The conduit includes an inner diameter smaller than a diameter of the oblong loop, thereby suspending the oblong loop in a hollow portion of the conduit.

The wire sheath may include a claw hook fastener on a top of the wire holder or an underside of the wire sheath. An oblong loop of a second wire holder is fastened to the claw hook fastener. Additional wire holders are chained together to the first wire holder and the second wire holder by connecting additional oblong loops to claw hook fasteners. Each wire holder of the first, second, and additional wire holders contains a portion of a wire, the fish tape pulling the first, second and additional wire holders and corresponding wires through the conduit from the oblong loop of the first wire holder.

Other objects and advantages will be apparent to those skilled in the art from the following detailed description taken in conjunction with the appended claims and drawings.

BRIEF DESCRIPTION OF THE DRAWINGS

FIG. 3 shows a top view of a flexible wire holder according to one embodiment of the invention;

FIG. 4 shows a side view of the flexible wire holder according to the embodiment shown in FIG. 3;

DETAILED DESCRIPTION OF THE INVENTION

The present invention provides a flexible wire holder for pulling wires through a conduit. The flexible wire holder according to the claimed invention provides a more efficient and sturdy solution for electricians to run wires through conduit. The invention allows for multiple wires to be pulled through a conduit or other cavity without the need to strip wires or use electrical tape. Even when multiple wires are needed, the flexible wire holder of the invention maintains a more streamlined cross-section in comparison to previous devices, allowing for smooth pulls of any number of wires through a conduit.

Figure 1:
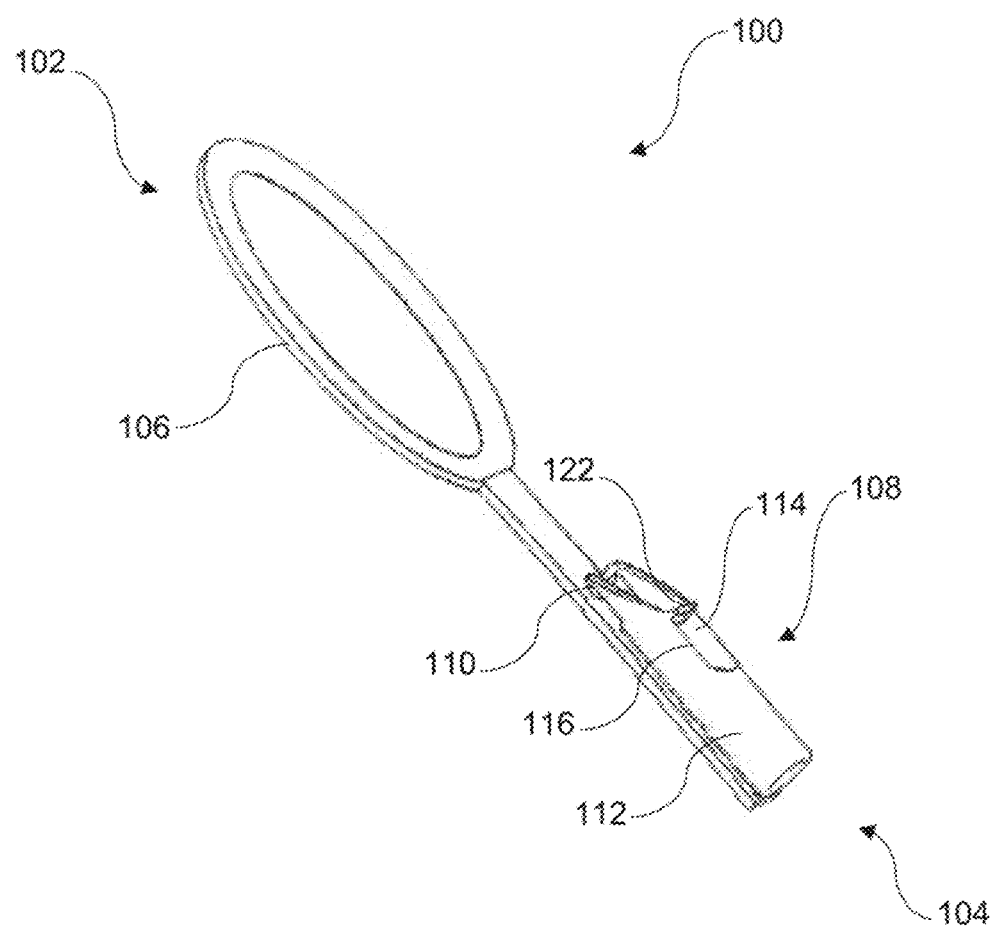
FIG. 1 shows a top perspective view of a flexible wire holder according to one embodiment of the invention.

FIG. 1 shows a flexible wire holder 100 according to one embodiment of the invention. The wire holder 100 predominantly includes a lead end 102, followed by a trail end 104. The lead end 102 includes an oblong loop 106. The oblong loop 106 is preferably oval-shaped, although other shapes may be used. The oblong loop 106 is sized to fit inside a conduit. The wire holder is preferably made of a flexible material, such as PA-6 NYLON, although other materials can be used. Multiple wire holders may be used with one run through a conduit. The wire holders are designed to be disposable for every new wire pull, although re-use of the wire holders can be achieved if desired.

The trail end 104 of the wire holder 100 includes a wire sheath 108. The wire sheath 108 includes a tube or cylindrical portion 112. The wire sheath 108 also includes an opening 114 on a surface 116 of the wire sheath 108. The opening 114 extends through the cylindrical portion 112. A portion of a wire that needs to be pulled can be inserted into the wire sheath through the opening. A fish tape or similar pull device can be attached to the oblong loop to pull the wire holder and the attached wire through a desire space. This eliminates the need to strip the wire before conducting the "pull" as the fish tape does not directly make contact with the wire. The fish tape instead makes contact with the oblong loop of the wire holder. The wire sheath 108 also includes a fastener 110 to connect the wire holder with a subsequent, trailing wire holder, if needed.

Figure 2:
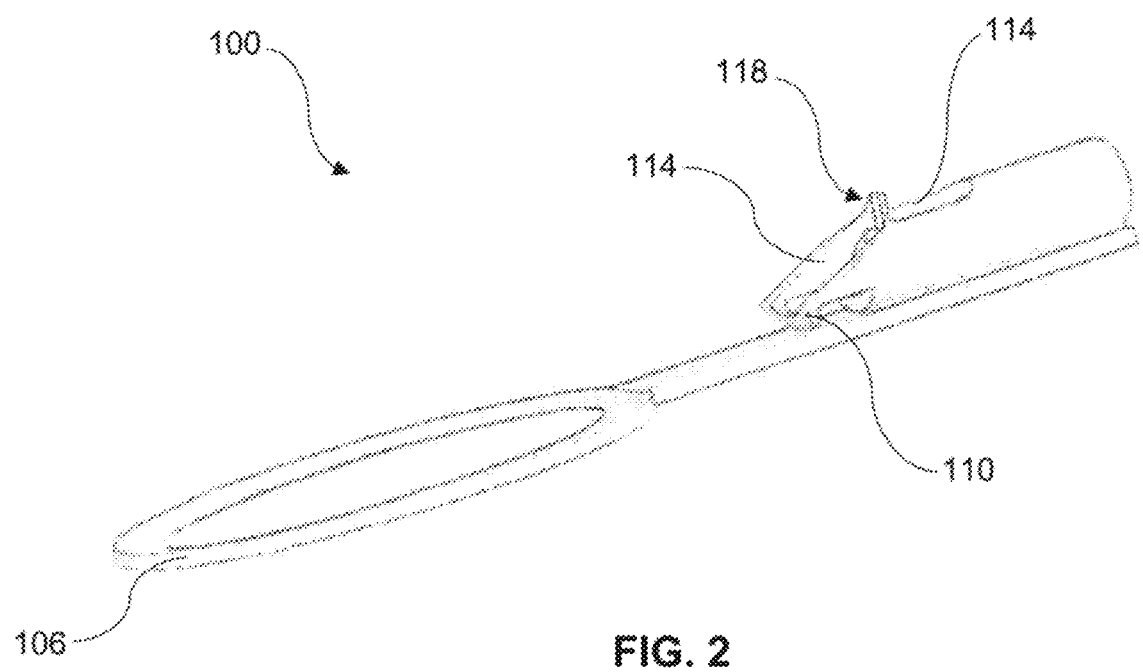
FIG. 2 shows a side perspective view of the flexible wire holder according to the embodiment shown in FIG. 1.

As shown, the wire sheath 108 may include a break piece 122 that extends laterally across part of the opening 114. The break piece 122 is meant to be sacrificial in that the break piece 122 is made of a thin thread of flexible material that is broken by a wire at first use of the wire holder 100. FIG. 2 shows a wire holder 100 with a lockable feature 118 across the opening 114. The lockable feature 118 may include any number of fastening mechanisms, such as the break piece shown in FIG. 1.

FIG. 3 shows protrusions 120 across the opening 114 as another embodiment of a fastening mechanism. The protrusions 120 may include two complimentary protrusions 120, each protruding from the wire sheath 108 across the opening 114. When a wire is inserted into the wire sheath 108 and pulled down past the protrusions 120, the wire is locked into the sheath and secured for the wire pull. This eliminates the need to tape any portion of the wire to the wire holder before commencing the "pull" of the wire through a conduit. In one embodiment of the invention, a bend is made in an end of a wire, which is then inserted into the wire sheath and then crimped. Preferably, the wire is bent approximately 180° to form a hook on an end of the wire. A tip of the hook portion is inserted into the opening of the wire sheath with the rest of the wire extending approximately 180° away from the trail end of the wire holder.

FIG. 3 also shows a length 130 that separates the two ends of the wire holder 100. A top view of the oblong loop 106 shows a diameter 132 across the widest part of the oval loop. The loop 106 also has an outer perimeter 136. The outer perimeter 136 makes contact with an inside of a conduit when the wire holder is in use. FIG. 4 shows a side view of a flexible wire holder 100. A lead end 124 of the wire sheath includes a claw hook 128 as the fastener. A trail end 126 of the wire sheath includes the cylindrical portion. The claw hook 128 protrudes from an underside 134 of the wire sheath. The claw hook 128 can trap an oblong loop of an adjacent wire holder. An edge of the oblong loop can snap past the claw hook and can then be held securely in a space beneath the underside of the wire sheath. The claw hook acts as a front stop, and the wire sheath acts as a back stop, thereby fastening one wire holder onto another. This allows subsequent wire holders to be secured to each other in a series or chain of wire holders (shown later in FIG. 9).

Figure 5:
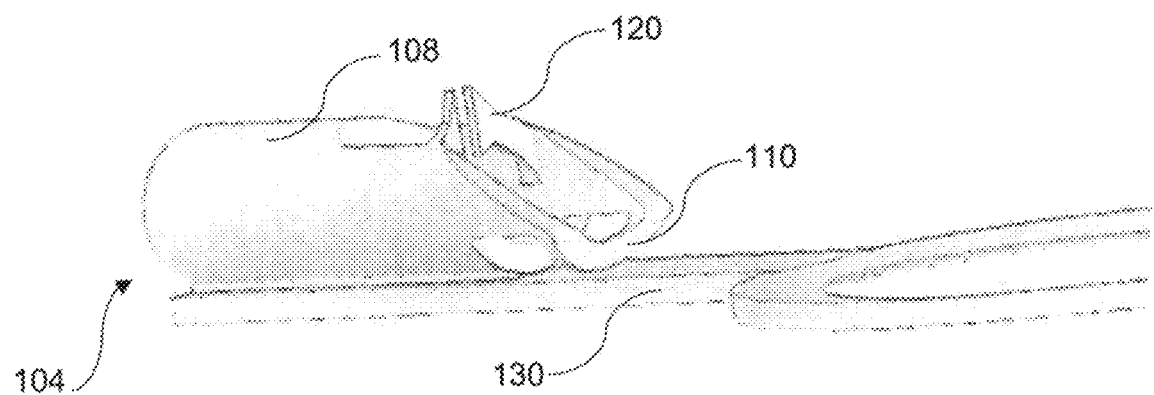
FIG. 5 shows a partial side perspective view of a trail end of a flexible wire holder according to one embodiment of the invention.
Figure 6:
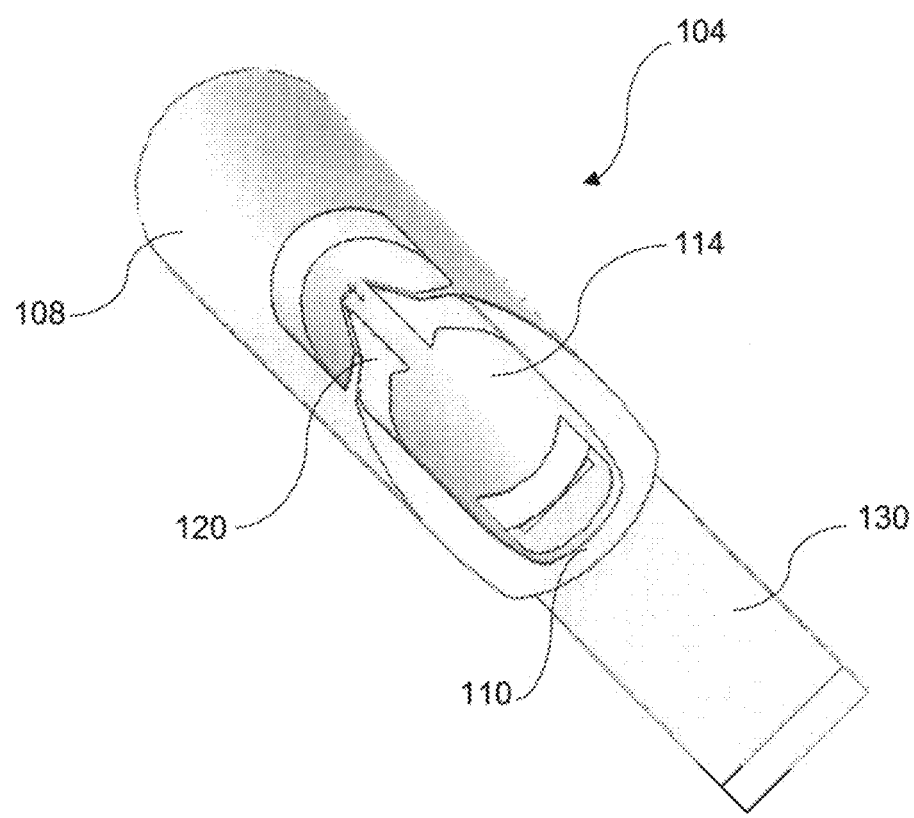
FIG. 6 shows a partial top perspective view of the trail end of the flexible wire holder according to the embodiment shown in FIG. 5.
Figure 7A:
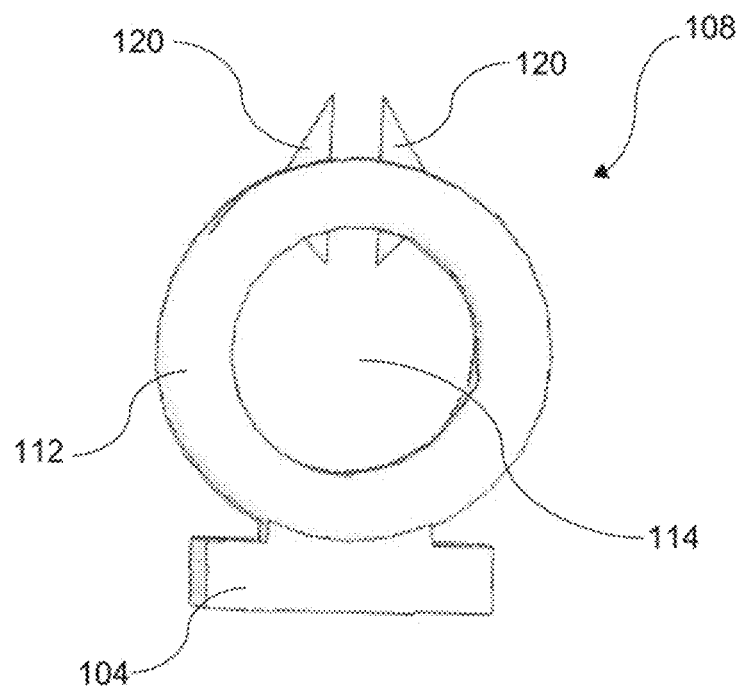
FIG. 7A shows a cross-sectional view of a wire sheath of a flexible wire holder according to one embodiment of the invention.
Figure 7B:
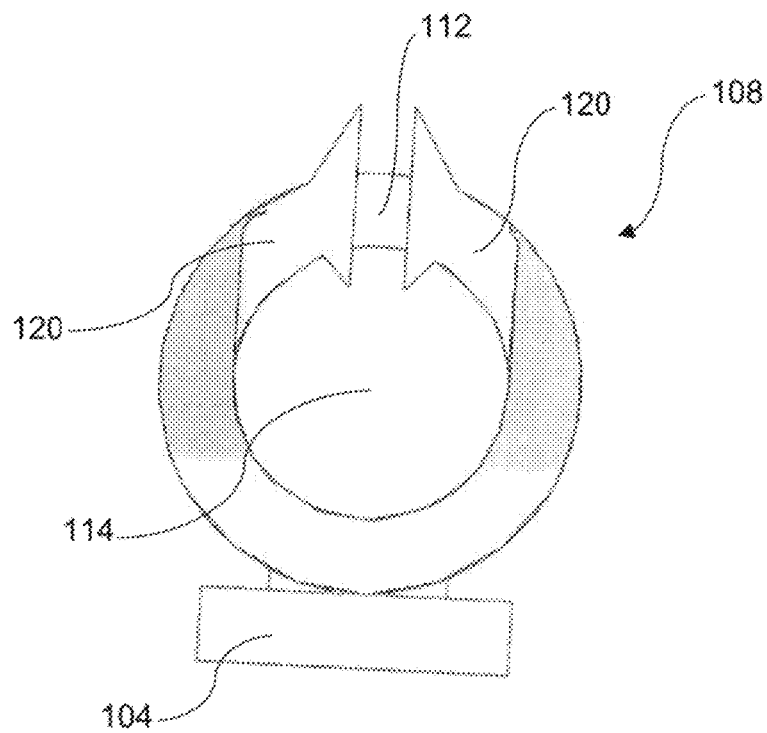
FIG. 7B shows a cross-sectional view of a wire sheath, opposite the cross-sectional view of FIG. 7A, of the flexible wire holder according to the embodiment shown in FIG. 7A.

FIG. 5 shows the trail end 104 of the wire holder 100. The fastener 110 forms a u-shaped bend on the wire sheath 108. The length 130 of the wire holder may be measured between the oblong loop and the fastener 110. The protrusions 120 each include a flat portion that runs perpendicular to the base of the wire holder. This flat portion provides a further backstop when a wire is inserted into the wire sheath. FIG. 6 shows another view of the trail end 104 of the wire holder where flat portions of the protrusions 120 have been depressed toward the trail end of the wire sheath/wire holder. Such a depression occurs after a wire has been inserted into the wire holder. The protrusions 120 prevent a wire from shearing off and/or pulling loose from the wire sheath by pushing against a surface of the wire if and/or when the wire is pushed back toward the lead end of the sheath. The wire can then be contained inside the opening of the wire sheath so the end of the wire cannot open up when being pulled or otherwise maneuvered. This is also reflected in FIG. 7A which shows a cross-sectional view of the wire sheath 108 from a trail end of a wire holder. As shown, the cylindrical portion 112 is in line with the protrusions 120. The opening 114 is predominantly circular to securely hold and account for the shape of a wire. FIG. 7B shows another cross-sectional view of the wire sheath 108 from a lead end of a wire holder.

Figure 8:
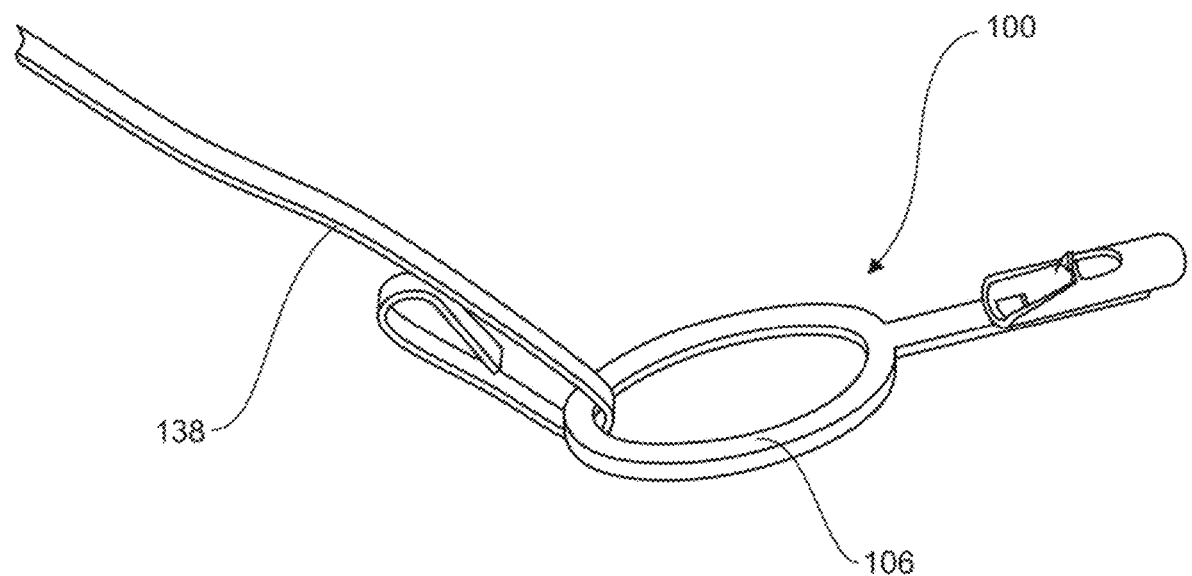
FIG. 8 shows a fish tape attached to a flexible wire holder according to one embodiment of the invention.

FIG. 8 shows a flexible wire holder 100 connected to an end of a fish tape 138. A hook is formed on the fish tape 138 which hooks onto the oblong loop 106 of the wire holder. The fish tape may include a hook or other type of grasping shape by forming said shape by bending and maneuvering the flexible steal of the fish tape. When the wire holder 100 is being used as a disposable wire holder, the holder can simply be cut off the end of the fish tape after pulling the desired wires, leaving a clean fish tape for another use. The holder can also be cut off the connected wires. This reduces time required between runs.

Figure 9:
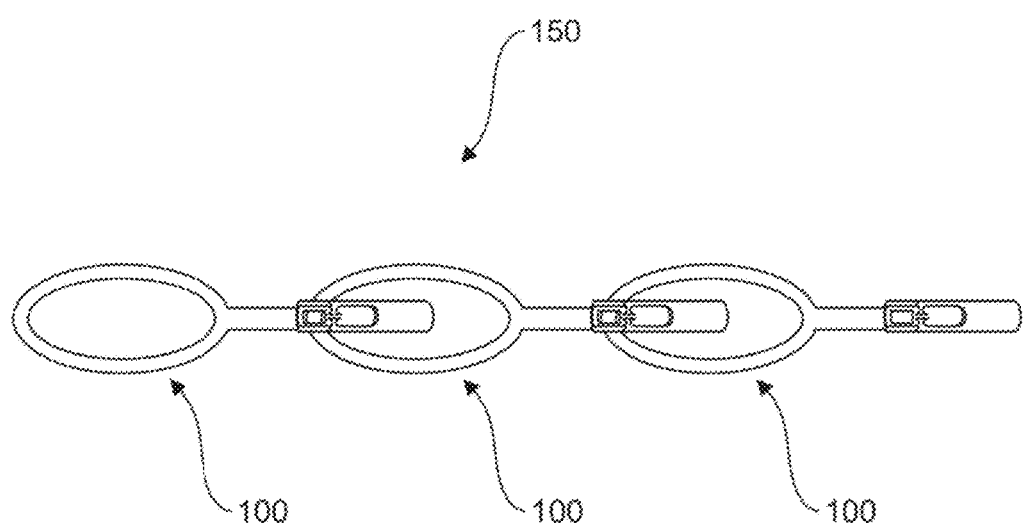
FIG. 9 shows a series of flexible wire holders according to one embodiment of the invention.

FIG. 9 shows a series of wire holders 150 connected to each other. A first wire holder 100 is connected to a trailing wire holder 100 (and so on) via a connection between the oblong loop and the fastener. The oblong loop of one wire holder hooks underneath the wire sheath via the fastener (such as a claw hook). The length of each wire holder is formulated so accurate spacing is obtained between each wire holder when hooked in the series 150. That is, the wire holders are spaced apart enough to connect together before or after each wire holder is connected to a wire. The wire holders can be "daisy chained" to allow for any number of wires to be attached to the fish tape without creating a bulk that needs to be pulled through a conduit. No matter how many wire holders are connected in series, there will be no cross-sectional accumulation of wires that need to be pulled through the conduit. The minimal bulk includes only the wire being pulled, the hooked potion of the wire, and the wire holder itself.

Figure 10:
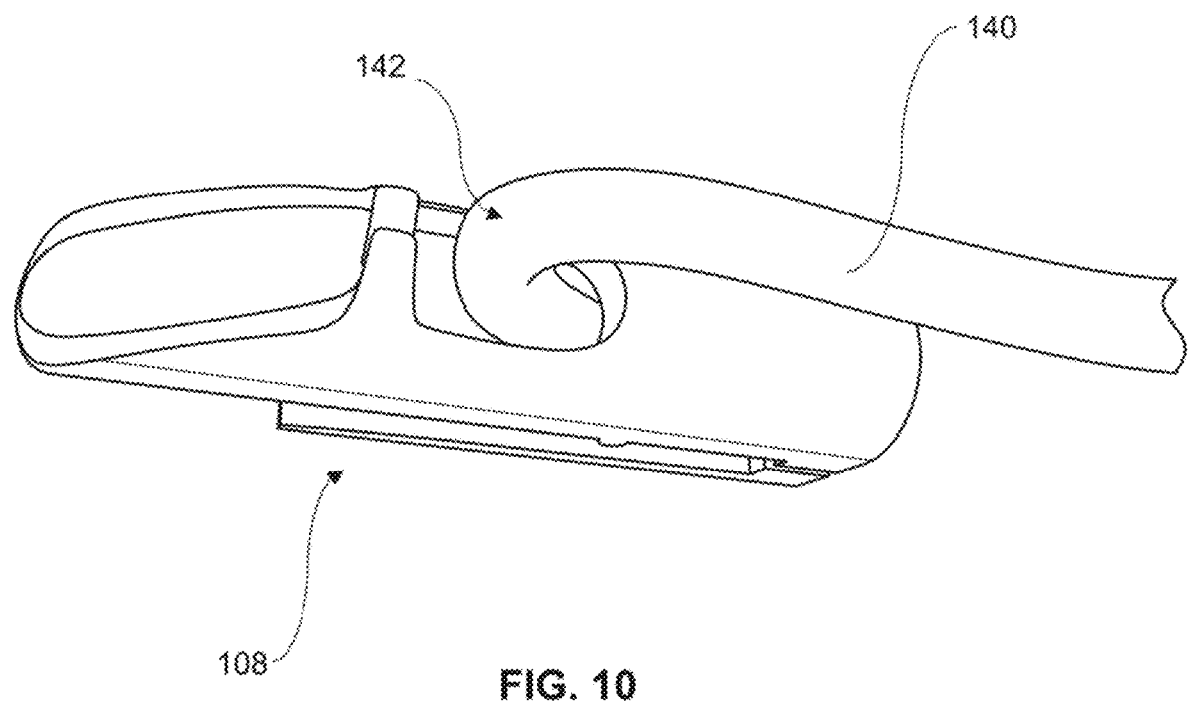
FIG. 10 shows a wire sheath connected to a portion of a wire according to one embodiment of the invention.

FIG. 10 shows a portion of a wire 140 engaging with a wire sheath 108. A hook portion 142 of the wire 140 is formed so that the hook 142 is inserted into the opening of the wire sheath 108. The hook 142 pushes past the lockable feature on the sheath 108 upon insertion, which then acts as a backstop against the hook 142 to keep the wire 140 securely inside the wire sheath. The rest of the wire extends down past the trail end of the wire sheath and wire holder.

Figure 11:
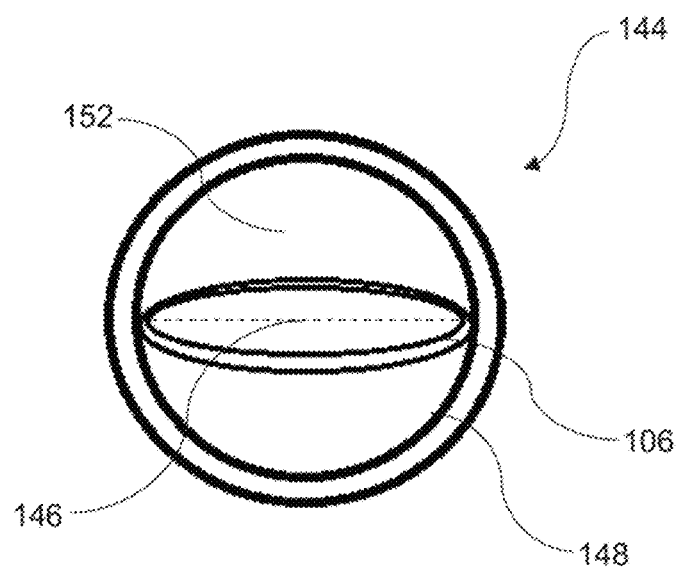
FIG. 11 shows a cross-sectional view of a conduit containing a flexible wire holder according to one embodiment of the invention.

FIG. 11 shows a cross-sectional view of a conduit 144 including a flexible wire holder. The conduit 144 has a hollow space 152 through which a wire holder can pass. An inner diameter 146 of the conduit is smaller than the diameter of the oblong loop 106 of the wire holder. As such, the oblong loop 106 pushes up against an inner surface 148 of the conduit 144. This pressure allows the oblong loop 106 to remain suspended inside the hollow space 152 by slightly bending to fit inside the conduit 144. This allows for more room in the hollow space 152 when a fish tape is inserted into the conduit 144 to grab onto the oblong loop 106. The wire holder is substantially centered inside the conduit by virtue of the oblong loop 106 which avoids any in-pipe obstacles and gives more room for the fish tape to grasp onto the loop.

Figure 12:
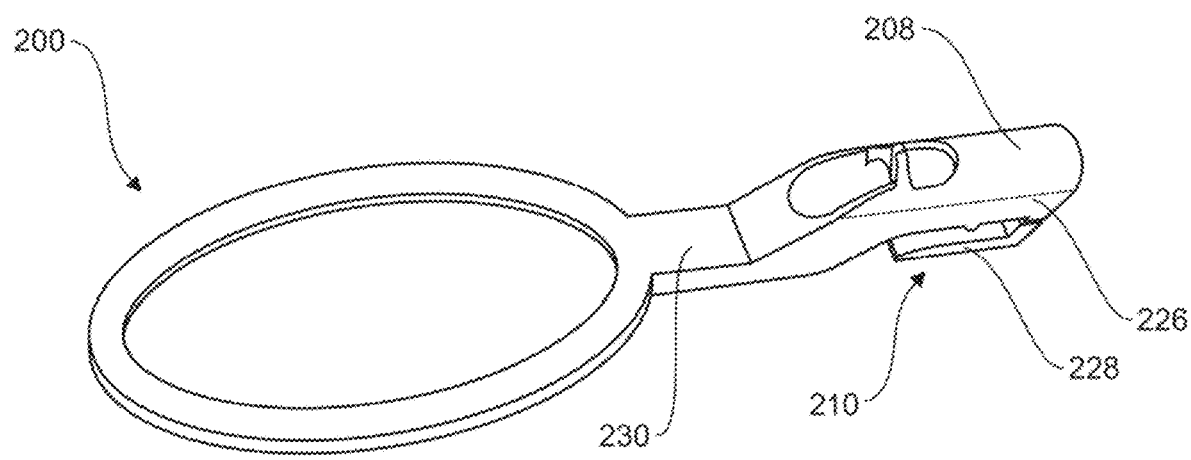
FIG. 12 shows a top perspective view of a flexible wire holder according to one embodiment of the invention.
Figure 13:
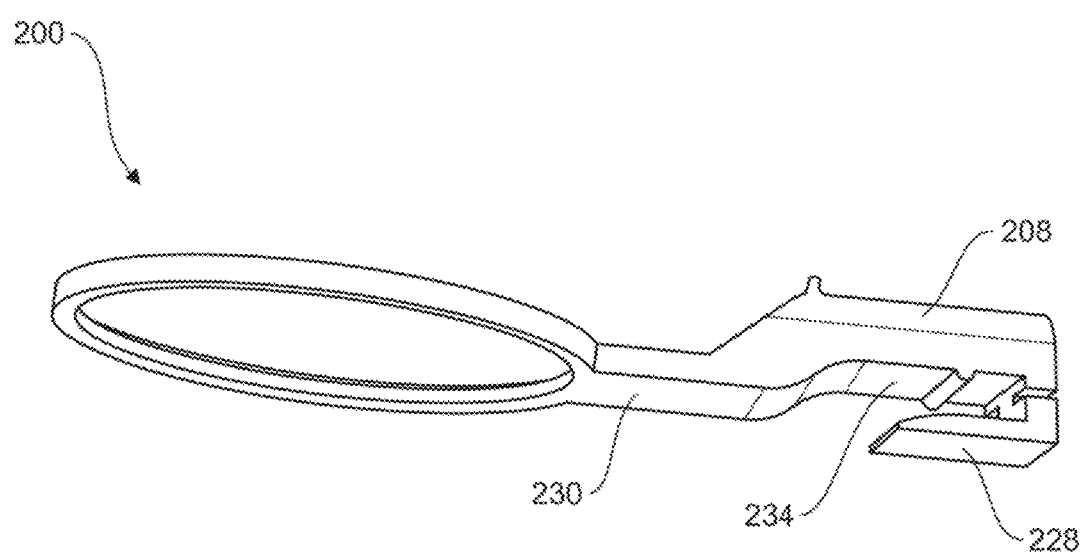
FIG. 13 shows a side view of a flexible wire holder according to the embodiment shown in FIG. 12.

FIG. 12 shows a flexible wire holder 200 according to another embodiment of the invention. Variations amongst wire holders may be achieved depending on the preferred method of manufacturing the wire holders—such as by 3D printing or injection molding. The flexible wire holder 200 includes a fastener 210 for connecting subsequent wire holders in series. The fastener 210 includes a claw hook 228 on an underside 234 of a wire sheath 208, which is further shown in FIG. 13. Here, the wire sheath 208 is fastened to a body 230 of the flexible wire holder 200. A trail end 226 of the wire sheath includes the fastener 210. An oblong loop of one wire holder hooks to another wire holder underneath the wire sheath from an underside of an oblong loop (via the fastener).

Figure 14:
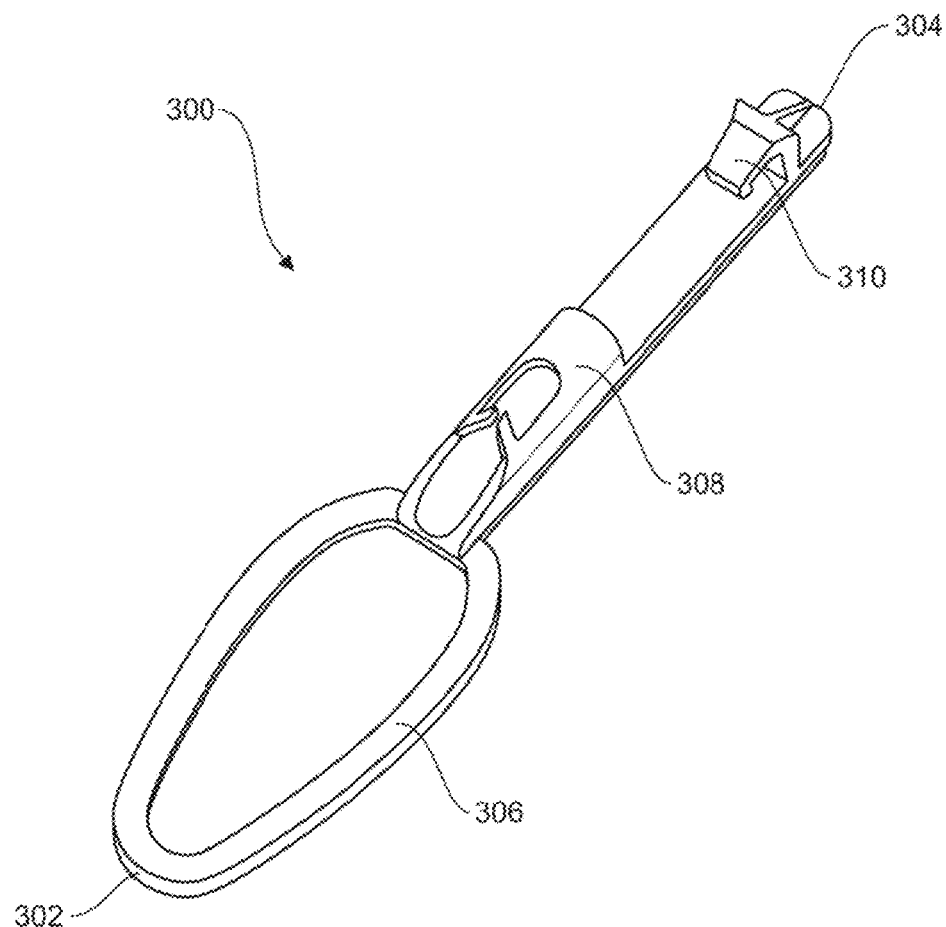
FIG. 14 shows a top perspective view of a flexible wire holder according to one embodiment of the invention.
Figure 15:
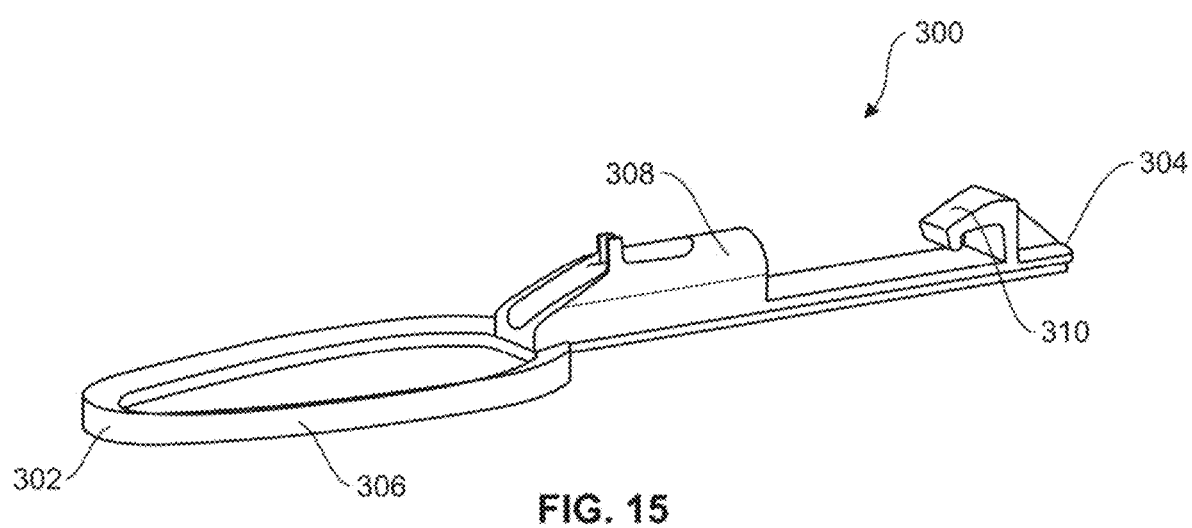
FIG. 15 shows a side perspective view of a flexible wire holder according to the embodiment shown in FIG. 14.
Figure 16:
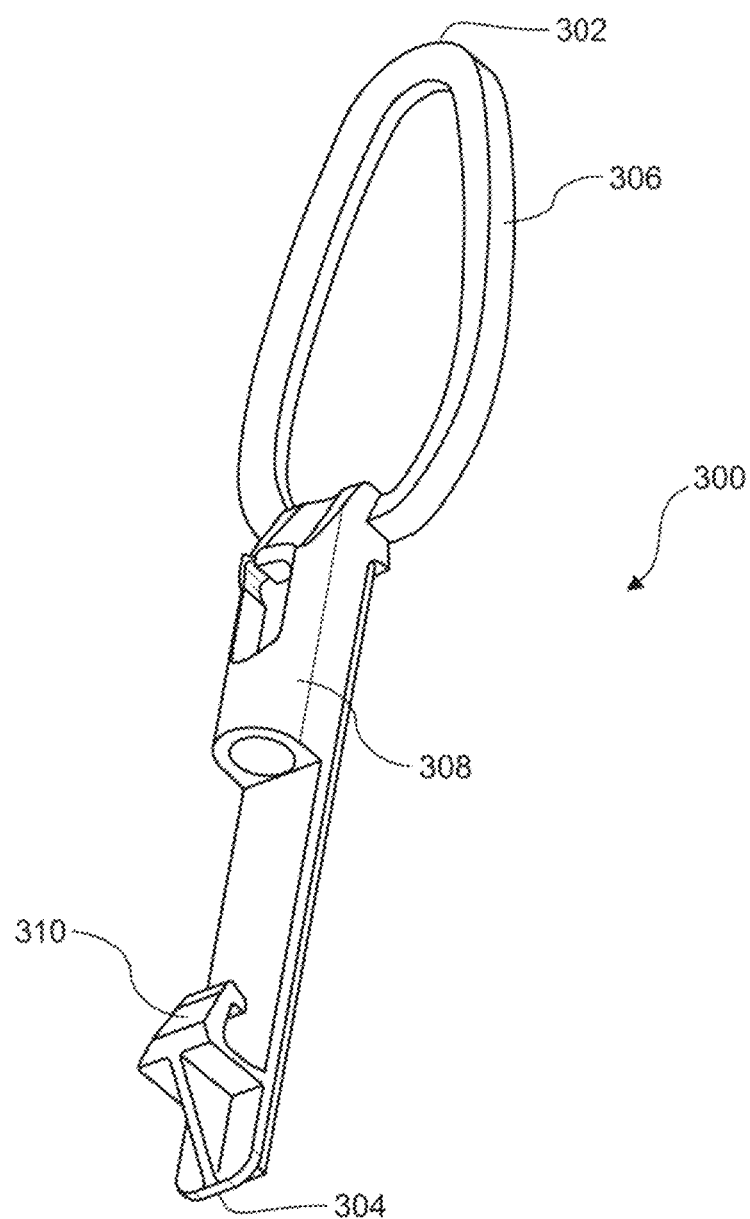
FIG. 16 shows a top perspective view of a flexible wire holder according to one embodiment of the invention.

FIGS. 14-16 show another embodiment of the invention. As shown in the figures, the wire holder 300 may include a lead end 302 having an oblong loop 306. A trail end 304 includes a fastener 310 configured to attach to the oblong loop 306 of an adjacent wire holder 300. As shown, the fastener 310 preferably comprises a claw hook 328 that can snap into connection with the oblong loop 306 at the lead end 302 of the adjacent wire holder 300.

In addition, the wire holder 300 preferably includes a wire sheath 308 positioned along a body of the wire holder 300 between the lead end 302 and the trail end 304. The wire sheath 308 may include a lockable feature 318 similar to that described above. As shown in FIGS. 14-16, the wire sheath 308 is located at a rearward end of the oblong loop 306, opposite the lead end 302. As such, the wire sheath 308 is positioned roughly mid-body along the wire holder 300 and the fastener 310 is separately positioned at the trail end 304 of the wire holder 300.

As described herein, the fastener 310 may be positioned at the trail end 304 of the wire holder 300 or may be positioned somewhere along the length of the body of the wire holder 300. Likewise, the wire sheath 308 may be positioned at the trail end 304 of the wire holder 300 or along the length of the body of the wire holder 300. Lastly, the fastener 310 may be integrated with the wire sheath 308 as shown in FIGS. 1 and 12 or may be separately positioned along the body of the wire holder 300 as shown in FIGS. 14-16.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A wire holder for use with a fish tape, the wire holder comprising:
   a lead end for attachment to the fish tape, the lead end including an oblong loop;
   a wire sheath positioned along the wire holder; and
   a trail end including a fastener configured to engage with an adjacent wire holder, wherein the fastener is configured to connect to an adjacent oblong loop, wherein the fastener is integrated with the wire sheath and wherein the fastener is located on a trail end of the wire sheath.

2. The wire holder according to claim 1 wherein the wire sheath comprises a cylindrical tube with an opening on a surface of the wire sheath, wherein the opening on the wire sheath is configured to accept a portion of a wire.

3. The wire holder according to claim 2 wherein the wire sheath comprises a lockable feature on the opening for holding the portion of the wire in the wire sheath.

4. The wire holder according to claim 3 wherein the lockable feature comprises two protrusions from the opening on the surface of the wire sheath.

5. The wire holder according to claim 3 wherein the lockable feature comprises a sacrificial break piece across the opening on the surface of the wire sheath.

6. The wire holder according to claim 1 wherein the fastener comprises a claw hook.

7. The wire holder according to claim 1, further comprising a length between the lead end and the trail end of the wire holder, wherein the wire sheath is located along the length and separate from the fastener.

8. A wire holder comprising:
   a lead end for attachment to a fish tape to be pulled through a conduit, the lead end including an oblong loop;
   a trail end of the wire holder and a length between the trail end and the lead end, the trail end including a fastener; and
   a wire sheath positioned along the length of the wire holder, wherein the wire sheath comprises an opening on a surface of the wire sheath, wherein the fastener is integrated with the wire sheath and wherein the fastener is located on a trail end of the wire sheath.

9. The wire holder according to claim 8 wherein the wire sheath is configured to accept a portion of a wire and to prevent the wire from retracting from the wire sheath.

10. The wire holder according to claim 9 wherein the opening of the wire sheath comprises a backstop protruding laterally across the opening, wherein the backstop engages with the hook of the wire.

11. The wire holder according to claim 8 further comprising a fastener on the wire sheath, wherein the fastener is configured to accept an oblong loop of another wire holder.

12. A wire holder for use with a fish tape, the wire holder comprising:
   a lead end for attachment to the fish tape, the lead end including an oblong loop;
   a wire sheath positioned along the wire holder, wherein the wire sheath comprises a cylindrical tube with an opening on a surface of the wire sheath, wherein the opening on the wire sheath is configured to accept a portion of a wire, and wherein the wire sheath comprises a sacrificial break piece on the opening for holding the portion of the wire in the wire sheath; and
   a trail end including a fastener configured to engage with an adjacent wire holder, wherein the fastener is configured to connect to an adjacent oblong loop.

13. The wire holder according to claim 12, wherein the fastener is integrated with the wire sheath.

14. The wire holder according to claim 13 wherein the fastener is located on a lead end of the wire sheath.

15. The wire holder according to claim 13 wherein the fastener is located on a trail end of the wire sheath.

16. Two or more adjoinable wire holders for use with a fish tape, each wire holder of the two or more adjoinable wire holders comprising:
   a lead end of at least one of the two or more adjoinable wire holders for attachment to the fish tape, the lead end including an oblong loop;
   a wire sheath positioned along the wire holder; and
   a trail end including a fastener configured to engage with an adjacent wire holder, wherein the fastener is configured to connect to an adjacent oblong loop of at least one other of the two or more adjoinable wire holders, wherein the fastener is integrated with the wire sheath and wherein the fastener is located on a trail end of the wire sheath.

17. The two or more adjoinable wire holders according to claim 16 further comprising a length between the lead end and the trail end of the wire holder, wherein the length allows for a trailing oblong loop of an adjacent wire holder to engage the fastener, wherein multiple oblong loops are configured to connect in a series of two or more wire holders.

18. The wire holder according to claim 17 wherein the series of wire holders is configured to pass through a conduit, wherein a diameter of each oblong loop of the multiple oblong loops is larger than an inner diameter of the conduit.

19. The two or more adjoinable wire holders according to claim 16 wherein each wire holder is connected with respect to another wire holder via the oblong loop and the fastener, wherein the fish tape is configured to pull the plurality of flexible wire holders through the conduit, and wherein an inner diameter of the conduit is slightly smaller than a diameter of the oblong loop.

* * * * *